United States Patent

Milligan et al.

[15] 3,643,890

[45] Feb. 22, 1972

[54] APPARATUS FOR THE AUTOMATIC THREADING OF A FLEXIBLE MEDIUM

[72] Inventors: Lee J. Milligan, Fairfield; Douglas M. Mayer, Wayne, both of N.J.

[73] Assignee: Certex, Inc., Fairfield, N.J.

[22] Filed: Nov. 18, 1969

[21] Appl. No.: 877,652

[52] U.S. Cl. ........................242/182, 179/100.2 CA, 226/91, 352/157

[51] Int. Cl. ....................................G11b 15/58, G11b 23/12

[58] Field of Search ........................................242/182–185; 34/120; 226/91, 92, 95, 97; 352/157, 158; 179/100.2 CA

[56] References Cited

UNITED STATES PATENTS

| | | | |
|---|---|---|---|
| 3,334,831 | 8/1967 | Bradt | 242/182 |
| 3,393,878 | 7/1968 | Aweida et al. | 242/182 |

*Primary Examiner*—Leonard D. Christian
*Attorney*—George E. Kersey

[57] ABSTRACT

A unit for transporting a flexible record-keeping member, such as magnetic tape, with respect to a transducer, such as a read-write head, in which the medium is automatically threaded over a circuitous path from a supply member to a takeup member.

Automatic threading is accomplished despite the circuitry of the tape path by the retracting of the read-write head and using a jet of fluid, such as air, to directly carry the lead end of the tape from a supply reel to a takeup reel. The jet of air emanates from a rectangular aperture to prevent spiraling of the tape as it approaches the takeup reel. The latter includes a vacuum hub that seizes the tape and applies continuous suction during the threading operation. The tape is subsequently directed into its final position, and the read-write head repositioned for "reading" the tape and "writing" on it.

10 Claims, 7 Drawing Figures

INVENTORS DOUGLAS M. MAYER
LEE J. MILLIGAN
BY George E. Kersey
ATTORNEY

APPARATUS FOR THE AUTOMATIC THREADING OF A FLEXIBLE MEDIUM

BACKGROUND OF THE INVENTION

This invention relates to the automatic threading of a flexible record keeping medium, and more particularly, to the automatic threading of magnetic tape used in data processing.

Record-keeping media are widely employed for the storage of information. One such a medium, which provides substantial amounts of storage for data processing, is magnetic tape. The tape is used in conjunction with a transport unit that contains a read-write head. As the tape from a supply reel is controllably advanced with respect to the head, data processing information is entered (written) on the tape or extracted (read) from it.

In a typical transport unit, the tape from a supply reel extends into a first vacuum column, over a bearing surface or drive capstan into contact with the read-write head, into a second vacuum column and then onto a takeup reel. This circuitous path, which includes the vacuum columns, is needed in order to achieve the desired control of the tape with respect to the read-write head. In particular, the vacuum columns are used to apply uniform tension to the tape.

In order to place the transport unit into operation, it is necessary to thread the tape from the supply reel to the takeup reel. Threading can be accomplished manually, but that is inconvenient and time consuming.

It has been suggested that automatic tape threading can be achieved by using jets of air in conjunction with suitable baffles or guides to direct the air streams as desired. One such example is the disclosure of U.S. Pat. No. 3,334,831 which issued to Gordon E. Bradt on Aug. 8, 1967.

The use of baffles or guides adds complexity and makes it necessary to employ a large number of jets of air. Moreover, this approach is not suitable for a data processing tape transport unit in which the tap travels a circuitous route in the course of its travel from a supply reel to a takeup reel.

Accordingly, it is an object of the invention to simplify the automatic threading of a record keeping medium from a supply member to a takeup member. A related object is to simplify the automatic threading of tape in a data processing tape transport unit.

Another object of the invention is to achieve the automatic threading of magnetic tape in a data processing transport unit where the tape travels a circuitous route from a supply reel to a takeup reel. A related object is to achieve automatic threading in a unit where tap from a supply reel enters a first vacuum column, extends about a transducer into a second vacuum column and then is connected to a takeup reel.

A further object of the invention is to eliminate the need for guide surfaces in the automatic threading of magnetic tape from a supply reel to a takeup reel. A related object is to limit the number of jets of air required for directing a strip of tape from a supply reel to a takeup reel.

Still another object of the invention is to eliminate spiraling of the tape during the course of being directed by a stream of air from a supply reel to a takeup reel.

SUMMARY OF THE INVENTION

In accomplishing the foregoing and related objects the invention provides for automatic threading of a flexible record keeping medium along a circuitous path from a supply source to a takeup member by way of a transducer. This is accomplished by propelling the record-keeping medium along a direct path from a source of supply to a takeup member, seizing the medium, and subsequently causing it to adopt a final path. Any component that would otherwise be an obstacle to the transition from the direct path to the final path is temporarily withdrawn. In the case where the medium is magnetic tape and the transducer is a read-write head, the lead end of the tape is directly propelled by a jet of fluid, such as air, to a takeup reel with a vacuum hub that seizes the tape. When the read-write head lies between the direct and final paths it is temporarily withdrawn and the tape caused to adopt its final path, after which the read-write head is repositioned.

In accordance with one aspect of the invention the jet of air which propels the tap directly to the takeup reel is shaped to prevent the lead end of the tape from spiraling. For that purpose, the jet emanates from a rectangular aperture which is positioned, for example, below the supply reel and is outwardly directed to the general vicinity of the hub of the takeup reel.

In accordance with another aspect of the invention, which applies to a transport unit where tension is applied to magnetic tape by the use of vacuum columns, a further jet of air is used to direct the tape, after being initially threaded on the takeup reel, into one of the vacuum columns.

In accordance with a further aspect of the invention, the hub of the takeup reel is designed to provide continuous suction on the lead end of the tape during the initial threading of the tape.

BRIEF DESCRIPTION OF THE DRAWINGS

Other aspects of the invention will become apparent after consideration of an illustrative embodiment, taken in conjunction with the drawings, in which.

DESCRIPTION OF AN ILLUSTRATIVE EMBODIMENT

Figure 1A:
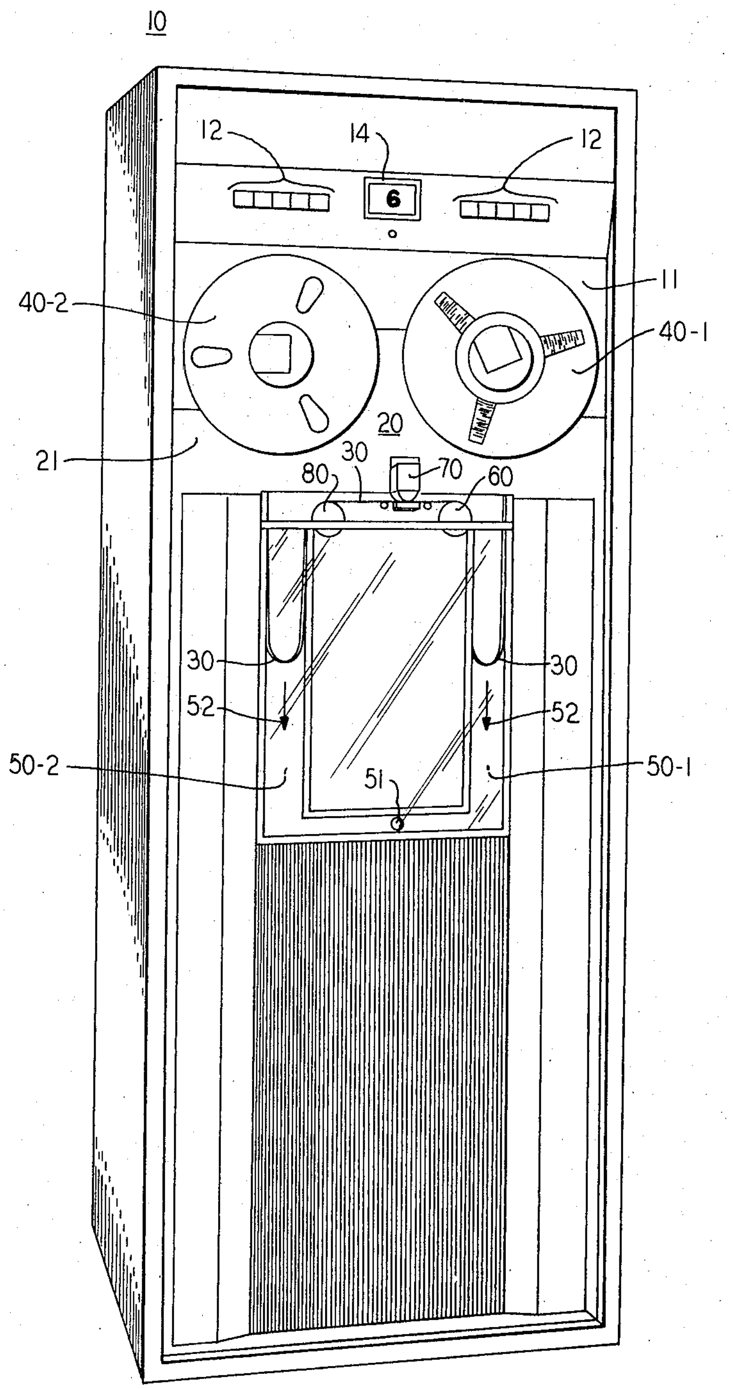
FIG. 1A is a perspective view of a transport unit for the automatic threading of a magnetic tape in accordance with the invention.

Turning to FIG. 1 of the drawings, a tape transport unit 10 in accordance with the invention includes an assemblage 20 of constituents behind a shield 21, by which a strip of tape 30 is automatically threaded from a supply reel 40-1 into a first vacuum column 50-1, over a bearing member 60, beneath a read-write head 70, over a drive capstan 80, into a second vacuum column 50-2 and then onto a takeup reel 40-2.

The vacuum columns 50-1 and 50-2 apply suitable tension to the tape 30 with respect to the drive capstan 80. The columns are evacuated through an inlet 51, producing force indicated by the downward arrows 52. When the capstan 80 is operated in a counterclockwise direction, the tape 30 is transported from the supply reel 40-1 to the takeup reel 40-2. For clockwise rotation of the capstan 80, the tape 30 is rewound from the takeup reel 40-2 onto the supply reel 40-1.

The path taken by the tape 30 additionally includes bearing surfaces (not shown in FIG. 1) at the entrance and the exit of the vacuum columns 50-1 and 50-2 and bearing surfaces in the vicinity of the read-write head 70.

The various constituents of FIG. 1 are on a recessed front panel 11 of the unit 10. The interior of the unit 10 includes motors of conventional design for driving the supply and takeup reels 40-1 and 40-2 and the capstan 80. Also included is a vacuum pump connected to the inlet 51. Control of the unit 10 is exercised by a suitable set of pushbuttons 12. The unit 10 is also identifiable within a data processing system by a settable designation, which appears at a window 14.

Before the unit 10 can be operated, a loaded supply reel 40-1 is mounted on the front panel 11 and the leader end of the tape 30 extends into the first vacuum column 50-1, over the bearing member 60, beneath the transducer 70, over the capstan 80, into the second vacuum column 50-2 and onto the takeup reel 40-2. Threading of the tape can take place manually, but is accomplished automatically in accordance with the invention, notwithstanding the indirectness of the path from the supply reel 40-1 to the takeup reel 40-2.

Figure 1B:
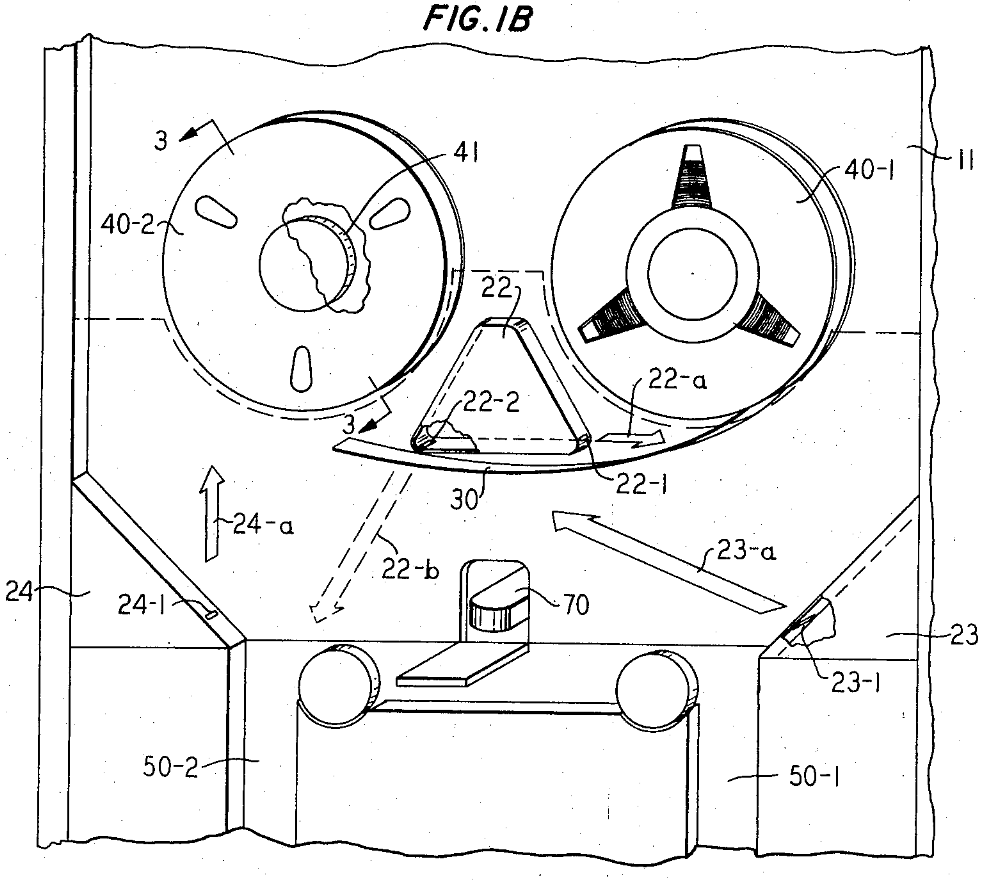
FIG. 1B is a partial view of the transport unit of FIG. 1A with its frontal shield removed to show various constituents used in the automatic threading of magnetic tape.

The assemblage of front panel constituents for accomplishing automatic threading of the tape 30 is shown in FIG. 1B, with the shield 21 of FIG. 1A removed. Included in the assemblage 20 are a dual chamber 22 and single chamber 23 and 24 by which streams of air are directed against the tape 30 on command. The read-write head 70 is shown in its retracted position so as not to interfere with the later transition from the direct tape path to the indirect path by way of the vacuum columns 50-1 and 50-2.

In addition, FIG. 1B shows the takeup reel 40-2 partly broken away to expose an apertured hub 41 by which suction is applied to the lead end of the tape 30 when it reaches the takeup reel 40-2.

The various chambers 22 through 24 are supplied with air pressure by the operation of air valves located behind the panel 11, as more particularly described below.

The dual chamber 22 has output ports 22-1 and 22-2. The airstream that emanates from the right-hand port 22-1 is indicated by an arrow **22*a* directed toward the rim of the supply reel 40-1; while the airstream from the left-hand port 22-2 is shown by a phantom arrow 22*b* to indicate that it is not operative when the tape 30 is in the particular position depicted in FIG. 1B**.

The lower right-hand chamber 23 has an output port 23-1 which is the origin of the jet of air **23*a* directed toward the hub 41 of the takeup reel 40-2 and indicated by an arrow 23*a*. The left-hand counterpart chamber 24 has an aperture 24-1 with an associated jet of air 24*a***.

In general the ports 22-1 and 2, 23-1 and 24-1 are rectangular in cross section to shape their associated airstreams **22*a* and *b*, 23*a* and 24*a* and prevent spiraling of the tape 30 as it is propelled from the supply reel 40-1 to the takeup reel 40-2. The rectangular cross-sectioning is particularly important for the port 23-1 which directly carries the tape 30 to the vicinity of the takeup hub 41**.

Figure 2A:
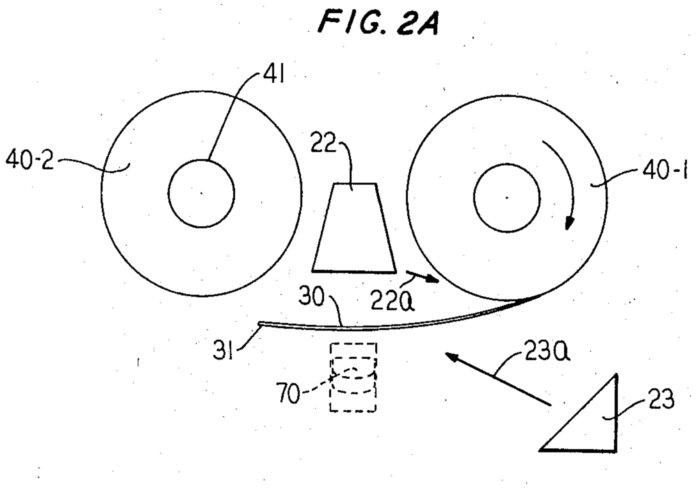
FIGS. 2A through 2C are fragmentary views illustrating the steps by which automatic threading takes place.
Figure 2B:
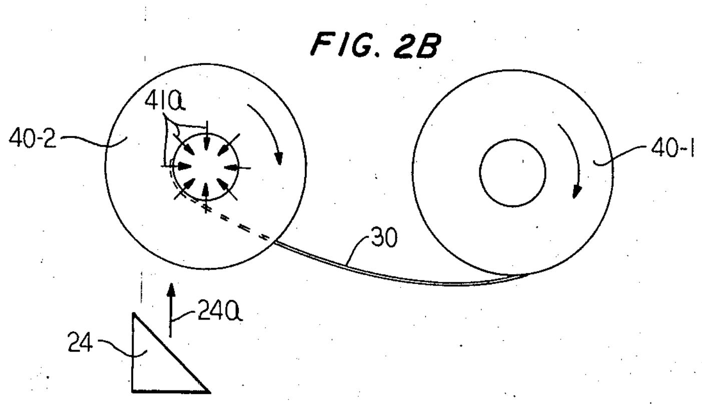
Figure 2C:
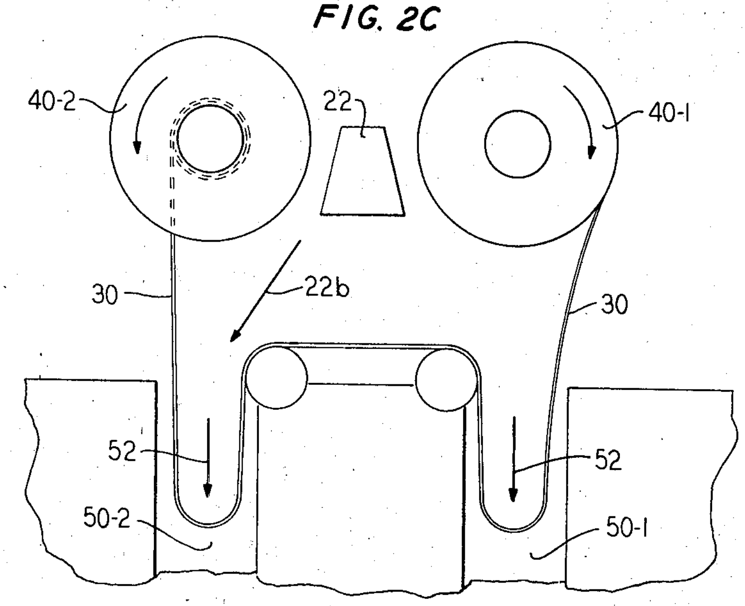

The action of the various jets of air **22*a* through 24*a* is outlined by FIGS. 2A through 2C during the course of automatic threading. Initially as shown by FIG. 2A, the jet 22*a* from the upper chamber 22 is directed at the leader end of the tape 30 on the supply reel 40-1. This facilitates separation of the leader end from the remainder of the tape coil as the reel 40-1** is rotated in a clockwise direction.

In general the air jet **22*a* is not needed unless the static electricity on the tape reel 40-1** is so great that the leader end does not separate from the remainder of the tape coil during clockwise rotation.

As indicated in FIG. 2A, with the read-write head 70 retracted (shown in phantom), there is direct access to the hub 41 of the takeup reel 40-2 for the tape 30, instead of by way of the final, circuitous path beneath the head 70. In order for the leader end 31 of the tape 30 to reach the vicinity of the hub 41 of the takeup reel 40-2, the air jet **23*a* is directed diagonally upward from below the supply reel 40-1**.

When the leader end 31 reaches the takeup reel 40-2, suction indicated radially by inward arrows **41*a* in FIG. 2B causes the leader 31 to become wrapped around the hub 41. This operation is facilitated by the use of the upward jet of air 24*a* from the chamber 24**.

Finally, as shown in FIG. 2C, after the tape 30 has been directly threaded upon the takeup reel 40-2, the reel is rotated in a counterclockwise direction to produce a loop of the tape 30 in the left-hand vacuum column 50-2 because of suction in the downward direction indicated by the left-hand arrow 52. This action is facilitated by a downwardly directed jet **22*b* from the chamber 22. A corresponding loop is formed in the right-hand vacuum column 50-1 due to suction and the continued clockwise rotation of the supply reel 40-1**.

It is to be noted that self-threading in accordance with the invention generally relies upon the diagonally directed jet **23*a* and the vacuum hub 41 and that the additional jets 22*a*, 22*b* and 24*a*** are auxiliary and may be omitted in most instances.

Figure 3:
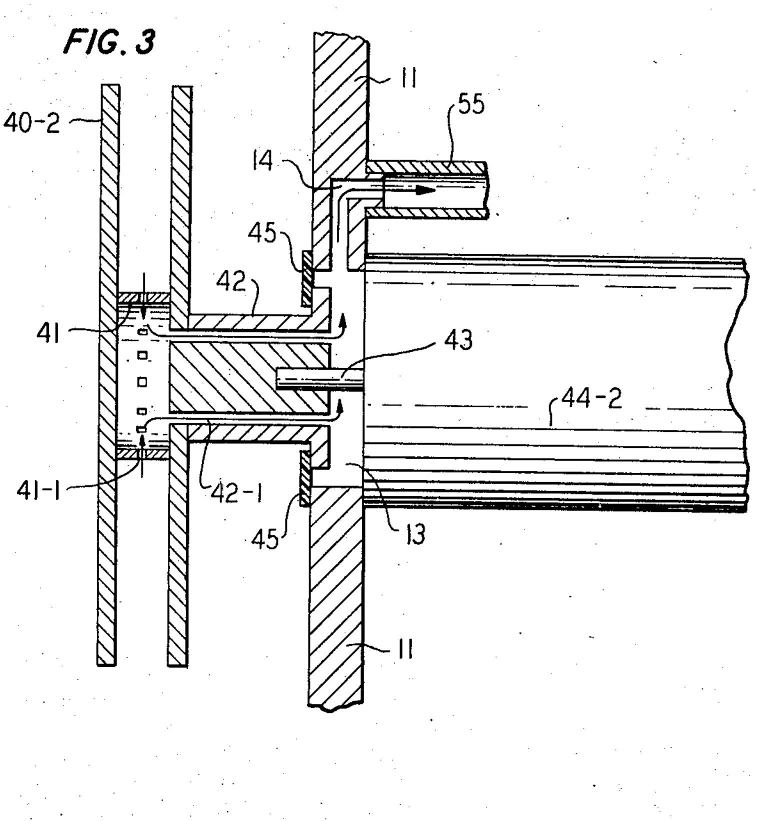
FIG. 3 is a cross-sectional view of the takeup reel in FIG. 1B showing details of its vacuum hub.

A cross-sectional view of the takeup reel 40-2 of FIG. 1B is shown in FIG. 3. The reel 40-2 has an extension 42 that is received by the drive shaft 43 of a reel motor 44-2. The latter is mounted on the reverse side of the panel 11 with its shaft 43 extending through a circular opening 13.

The reel 40-2 is constructed so that suction can be supplied continuously through apertures 41-1 of the hub 41 during the automatic threading operation. For that purpose, the extension 42 includes passageways 42-1 which communicate between the interior of the hub 41 and the chamber formed at the panel opening 13 between the extension 42 and the motor 44-2.

Vacuum is applied to the hub 41 through the passageways 42-1 by way of the chamber 13 through an inlet passage 14, which is connected to a vacuum line 55. To seal the chamber 13 when the vacuum is applied, a ring 45 of flexible material is affixed to the front of the panel 11. The inside circumferential portion of the ring 45 is drawn against the extension 42 when vacuum is present, providing the desired seal in a way that permits continuous suction at the hub 41 during the automatic threading operation. A suitable material for the ring 45 is plastic formed from polyethylene terephthalate and sold and marketed under the trade name "Mylar".

Figure 4:
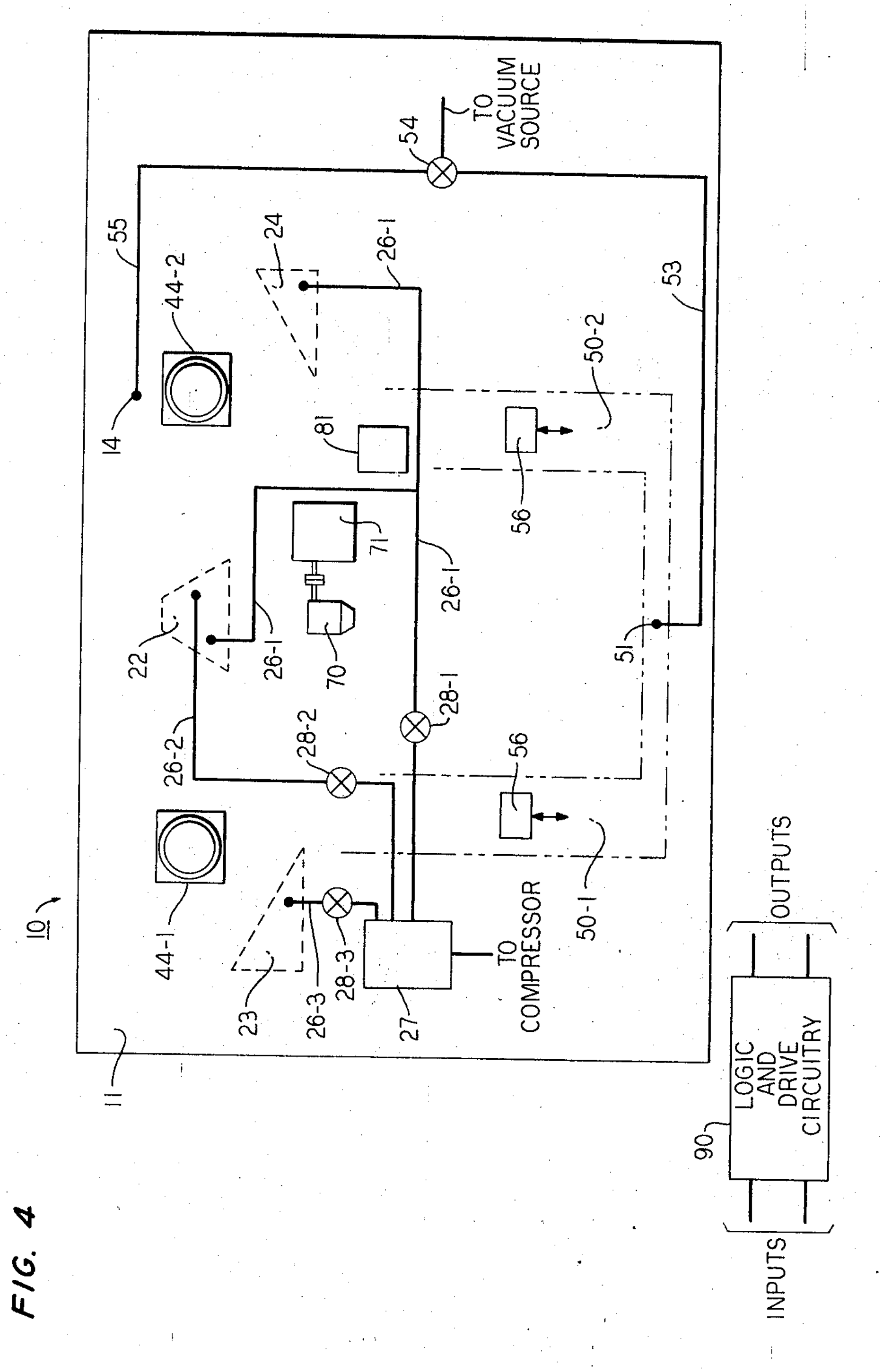
FIG. 4 is a schematic diagram of fluidic and electrical connections for the transport unit of FIG. 1A.

A view of various constituents seen from the interior of the unit 10 is given in FIG. 4. The chambers 22 through 24 (shown in phantom) are connected to the double-branch pneumatic line 26-1, and the single branch lines 26-2 and 26-3. Included in the respective lines which extend to a buffer 27, are electrically actuated control valves 28-1 through 28-3. The buffer 28 is in turn connected to a compressor (not shown).

Mounted on the rear of the panel 11 in order to drive the supply reel 40-1 and the takeup reel 40-2 are reel drive motors 44-1 and 44-2. These drive motors are operated from an electronic package 90 of logic and drive circuits whose constituents (not shown) are of conventional design.

Also shown in FIG. 4 is the piping that supplies vacuum to the columns 50-1 and 50-2 (shown in phantom). A conduit 53 extends from the inlet 52 to an electrically actuated control valve 54. A further conduit 55 extends from the valve 54 to the inlet 14 of vacuum hub 41 shown in FIG. 3. When the valve 54 is operated from the logic network, vacuum is switched from the columns 50-1 and 50-2 to the vacuum hub 41.

Also shown in FIG. 4 is a capstan drive motor 81 and the read-write head positioning motor 71 by which the read-write head 70 is retracted during the initial phases of the self-threading operation. Both the positioning and drive motors 71 and 81 are operated from the electronic package 90 of logic and drive circuits. Pressure-sensitive transducers 56 monitor the pressure in the vacuum columns 50-1 and 50-2 in accordance with the teachings of the copending patent application of Lee J. Milligan, Ser. No. 820,471 filed Apr. 30, 1969.

In order to initiate the automatic threading of the tape 30, the load button of the set 12 shown in FIG. 1 is depressed. This causes the supply reel 40-1 to rotate in a clockwise direction, generally causing the lead end of the tape 30 to separate from the remainder of the coil on the reel. At the same time the takeup reel 40-2 is also rotated in a clockwise direction, and valves 28-1 and 28-3 are operated to produce the jet **22*a* for further separation of the tape leader; the jet 23*a* which blows the leader to the vicinity of the takeup hub 41 and the jet 24*a* which blows the leader onto the takeup reel 40-2**.

Simultaneously the vacuum on the line 53 is switched from the columns 50-1 and 50-2 to the hub 42.

Subsequently, when the supply reel 40-1 begins to accelerate as detected, for example, by a voltage tachometer comparator, that indicates that the first phase of the automatic threading has been completed. A timing unit then operates to allow the takeup reel 40-2 to accumulate a desired number of coils of tape. At the end of the timing interval, rotation of the supply reel 40-1 continues in a clockwise direction, but the takeup reel 40-2 is rotated in a counterclockwise direction.

Simultaneously the vacuum is removed from the hub 41 and switched to the columns 50-1 and 50-2. The counterclockwise rotation of the takeup reel 40-2, together with the effect of the vacuum, tends to produce the desired tape loop in the nearby column 50-2. This result is facilitated by the action of the jet 22*b* that is switched on and downwardly directed into the vacuum column 50-2.

When the tape loop reaches the halfway position in the vacuum column 50-2, the output of the associated pressure-sensitive transduce 56 causes the takeup reel 40-2 to stop and to await the realization of a similar condition in the other vacuum column 50-1. When the latter condition is attained, the circuitry 90 activates the capstan motor 81 and drives the tape 30 to the BOT ("beginning of tape") position.

While the various aspects of the invention have been set forth by the drawings and specification, it is to be understood that the foregoing detailed description is for illustration only and that various changes in the constituents, as well as the substitution of equivalents for those shown and described, may be made without departing from the spirit and scope of the invention.

What is claimed is:

1. Apparatus for automatically threading a flexible medium from a source of supply to a takeup member, comprising means for providing an indirect path for the medium in said apparatus from the source of supply to the takeup member, means for propelling said medium directly from said source to said takeup member, means in said takeup member for seizing the medium thus propelled, means for causing said medium to adopt said indirect path, a retractable transducer in the vicinity of said indirect path, and means for retracting said transducer before said medium is propelled to said takeup member and for repositioning said transducer after said medium is caused to adopt said indirect path.

2. Transport apparatus as defined in claim 1 wherein said flexible medium is magnetic tape, said source is a supply reel, and said takeup member is a takeup reel with a hub therein; and means for propelling said magnetic tape comprises a chamber with an aperture for providing a jet of air that extends directly from the vicinity of said supply reel to the vicinity of the hub of said takeup reel.

3. Apparatus as defined in claim 2 wherein the cross section of the aperture of said chamber is rectangular, thereby to prevent spiraling of said magnetic tape during the propulsion thereof to said takeup reel.

4. Apparatus as defined in claim 2 wherein the means for seizing said magnetic tape comprises a chamber in the hub of said takeup reel, a course of apertures thereover and means for applying a vacuum to said chamber.

5. Apparatus as defined in claim 4 wherein the means for applying a vacuum comprises an extension of said hub connected to a shaft of a motor for driving said takeup reel, means for supporting said motor with said shaft extending through an opening therein, a passageway through said extension and communicating with said chamber of said hub and said opening of the supporting means, a passageway in said supporting means extending to a vacuum pump, and means for sealing said opening with respect to said extension when said vacuum is applied.

6. Apparatus as defined in claim 5 wherein the sealing means comprises a ring of flexible material attached to said supporting means about the opening therein and encircling a rotatable part of the extension of said hub.

7. Apparatus as defined in claim 6 wherein said material is of a class of plastics including polyethylene terephthalate.

8. Apparatus as defined in claim 1 wherein said flexible medium is magnetic tape, said source is a supply reel, said takeup member is a takeup reel with a hub therein, and said transducer is a read-write head;

the means for propelling said magnetic tape comprises a chamber with an aperture providing a jet of air that extends directly from the vicinity of said supply reel to the vicinity of said takeup reel.

9. Apparatus as defined in claim 8 wherein said supply reel is mounted on said apparatus in alignment with said takeup reel and said indirect path extends from said supply reel into a first vacuum column, over a first bearing surface, into contact with said read-write head, over a drive member, into a second vacuum column, and onto said takeup reel.

10. Apparatus as defined in claim 9 further including a chamber with an aperture for providing a jet of air that extends into one of the vacuum columns.

* * * * *